United States Patent

[11] 3,596,041

| [72] | Inventors | Larry D. Frus;<br>John C. Lindgren; Marion D. Woods, all of Whittier, Calif. |
|---|---|---|
| [21] | Appl. No. | 847,529 |
| [22] | Filed | July 31, 1969 |
| [45] | Patented | July 27, 1971 |
| [73] | Assignee | Stoody Company |

[54] ROLLER REBUILDING SYSTEM
4 Claims, 6 Drawing Figs.

[52] U.S. Cl. ................................ 219/76, 219/73
[51] Int. Cl. ................................ B65d 9/02, B65d 43/00
[50] Field of Search ........................ 219/76, 73; 277/34, 34.6

[56] References Cited
UNITED STATES PATENTS

| 2,841,687 | 7/1958 | Richter | 219/76 |
|---|---|---|---|
| 2,938,997 | 5/1960 | Anderson | 219/73 |
| 3,037,456 | 6/1962 | Neilon | 277/34.6 |
| 3,109,919 | 11/1963 | Mattson | 219/73 |
| 3,351,349 | 11/1967 | Chenouvetti | 277/34 |
| 3,514,568 | 5/1970 | Frus et al. | 219/76 |

Primary Examiner—J. V. Truhe
Assistant Examiner—L. H. Bender
Attorney—Nilsson, Robbins, Wills and Berliner ABSTRACT: A system for rebuilding worn tractor rollers is disclosed. The rollers are rebuilt without disassembly by applying weld metal while circulating a fluid coolant through the lubricating passages by means of a fluid injection system that utilizes a resiliently deformable pressure-controlled seal. A drive-dog mechanical arrangement incorporating a contact pin revolves the workpiece roller under an arc welding apparatus to which wire is fed, to deposit the metal for reconstruction. The arc welding apparatus is adjustable to accommodate deposition on the cylindrical portion of the roller as well as the flanges, and therefore may be moved through substantially a 90° angle. Granular flux is supplied to the arc, to accomplish submerged-arc welding. The flux is delivered by a vibrating trough and caught by a collector for reuse.

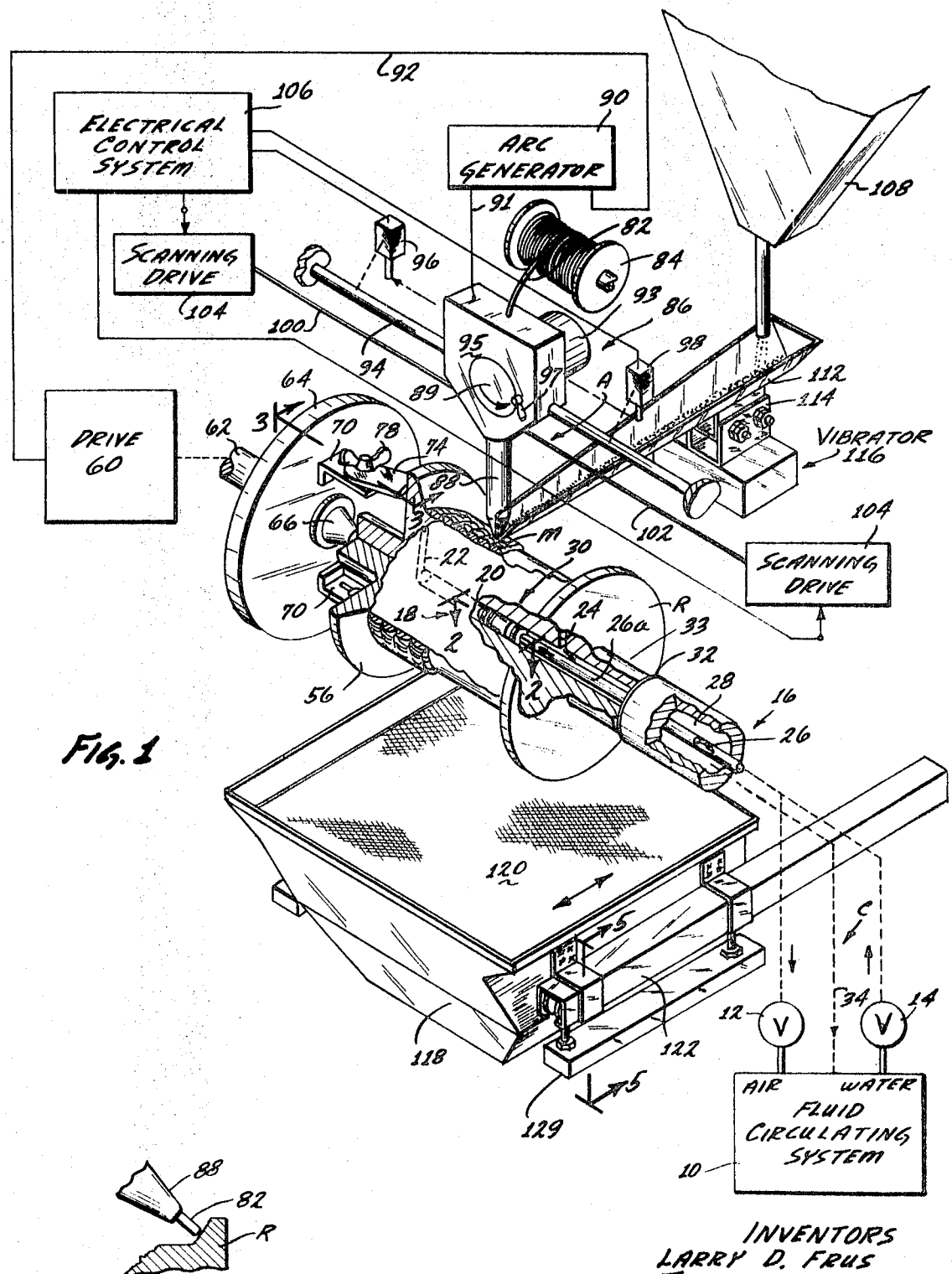

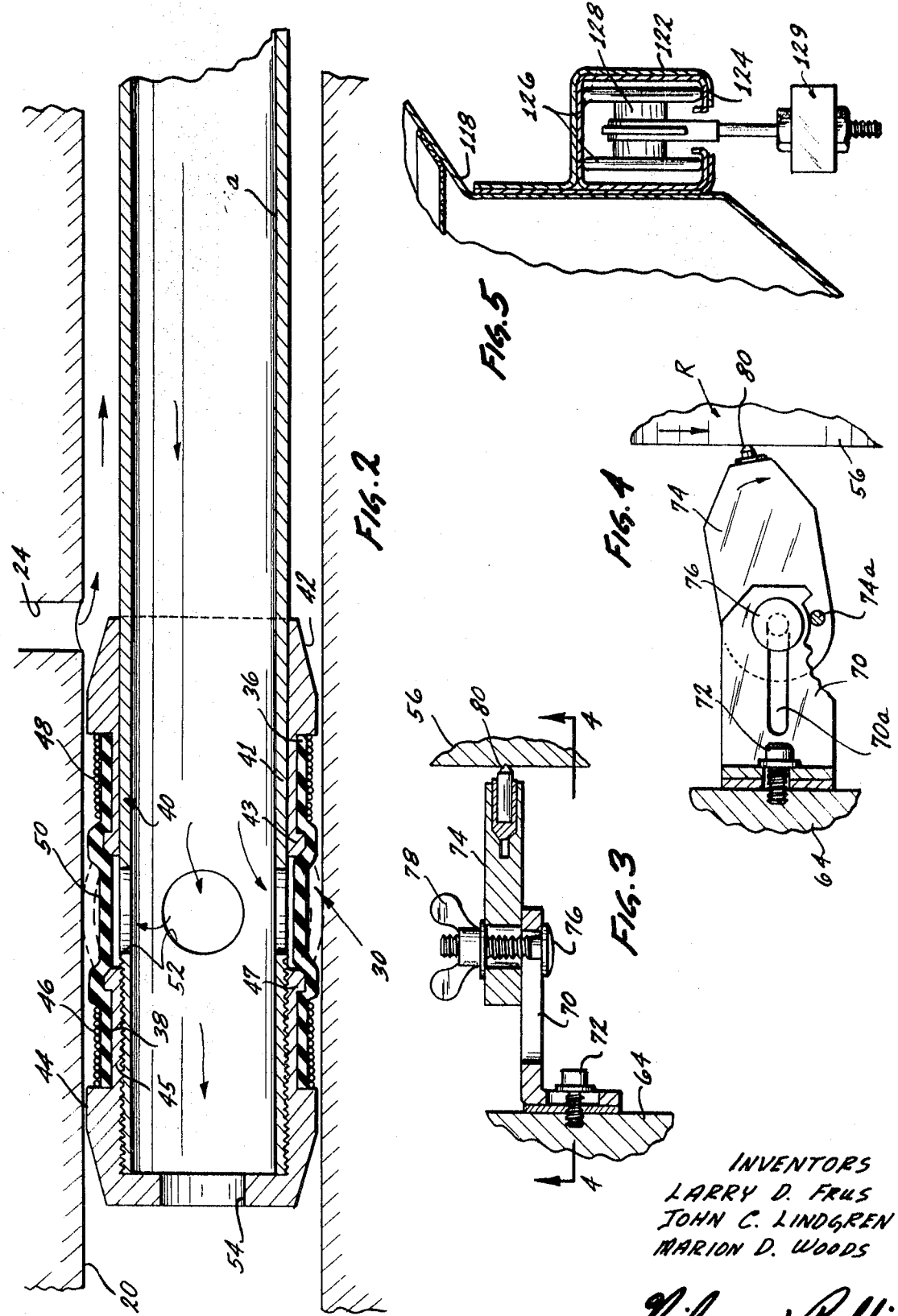

ROLLER REBUILDING SYSTEM

BACKGROUND AND SUMMARY OF THE INVENTION

The process of rebuilding worn parts by the deposition of weld metal is well known and widely practiced. Weld metal can be effectively applied to build up worn members or in initial manufacturing operations to accomplish a hard metal layer. As a specific example, tractor rollers incur considerable wear and after an extended period of use, they are commonly rebuilt by welding techniques. An improved system for rebuilding tractor rollers without complete disassembly is shown and described in applicant's U.S. Pat. No. 3,514,568 issued May 26,1970. The effectiveness and economy of that system as a significant improvement in the art, prompted additional development work, resulting in the further improved system which is the subject hereof.

The above-referenced patent application discloses a method of arc-welding hard-surface metal on a rotary workpiece which includes an external rim that is matingly engaged on an internal hub structure, and wherein lubricating spaces are defined between the rim and the hub structure. The process involves a technique of utilizing the lubricant passages in the assembled roller to circulate a continuous flow of coolant through the workpiece. As a result, arc-welding apparatus can deposit metal upon worn surfaces of the rim while the rim is moved in relation to the electrode and the hub structure without disassembly or damage to heat-sensitive seals or the like.

In general, the improvements hereof relate to an effective means for communicating the fluid flow into the lubricant passages, means for supplying flux to the workpiece to accomplish submerged welding, structure for providing weld metal at specific locations of a roller workpiece, an improved apparatus for moving the rim of the roller relative to the welding apparatus, and to various specific design features.

BRIEF DESCRIPTION OF THE DRAWINGS

In the drawings, which constitute a part of this specification, an exemplary embodiment illustrating various objects and features hereof is set forth as follows:

FIG. 1 is a diagrammatic and trimetric view of an apparatus for rebuilding tractor rollers in accordance with the principles of the present invention;

FIG. 2 is an enlarged sectional view through a portion of the structure of FIG. 1;

FIG. 3 is a sectional view through another portion of the structure as shown in FIG. 1;

FIG. 4 is a sectional view taken along line 4–4 of FIG. 3;

FIG. 5 is a sectional view taken along line 5–5 of FIG. 1; and

FIG. 6 is a fragmentary sectional view of a portion of the structure of FIG. 1 showing component parts in a different relationship.

DESCRIPTION OF THE ILLUSTRATIVE EMBODIMENT

Referring initially to FIG. 1, it is to be noted that the drawing is presented primarily to accomplish a conceptual understanding of the composite system. Consequently, component parts are not in scaled-size relationship nor are all fasteners supports and the like shown; however, for the component parts the arrangement and nature of such elements would be readily apparent to one skilled in the art.

FIG. 1 shows a roller R which is being rebuilt to specified dimensions by the deposition of weld metal M. The roller R receives the weld metal M from an arc-welding apparatus A, as the roller revolves, (to distribute the metal) and is cooled by a circulating fluid that is provided from a cooling system c, as described in detail below. In general, it is important to note that the roller R concurrently receives circulating cooling fluid, deposited weld metal, and rotational energy. Additionally, flux (in granular form) is supplied to the roller R in order to provide a submerged-arc mode of deposition for the metal M. Subsequent to the metal-deposition phase, a purging fluid, e.g., dry air, is circulated through the lubricant passages to remove all the coolant, e.g., water.

The coolant and purging fluid are supplied to the roller R from a fluid circulating system 10 represented in FIG. 1, simply as a block.

As disclosed in the above-referenced prior system, the unit 10 may include a reservoir tank and means for supplying fluid therefrom. Specifically, the unit 10 may include air and water tanks with means for forceful delivery therefrom as well known in the prior art. The system 10 is connected through valves 12 and 14 to (shown in fragment) which is coupled to the internal lubricating passages 18 of the roller R a concentric duct member 16. It is to be noted, as disclosed in the above-referenced prior system, that the lubricating passages 18 within the roller R include a central axial passage 20 which branches into at least two transverse passages 22 (left) and 24 (right) which are also interconnected through peripheral passages (not shown) as between the rim and hub of the roller.

In general, according to the basic operation of the system hereof fluid is injected into the axial passage 20, forced to move radially through the passage 22, then returned through the passage 24 and discharged from the roller R.

Considering the fluid circulating structure in greater detail, concentric ducts 26 and 28 are provided in the duct member 16 for injecting the fluid streams. The duct member 16 is connected by a coupling 32 to an injection structure 33 which is received in the central passage 20 of the roller R and from which the elongate duct extensions 26a protrudes.

The internal duct extension 26a extends well within the roller and terminates at a seal 30 (described in detail below) which prevents the fluid from flowing through the duct 26 and passing backwards around the extension 26a. That is, the seal 30 forces fluid to flow radially outward through the passage 22 and inward through the passage 24. Recapitulating, the fluid path is from the fluid circulating system 10, through one of the valves 12 or 14, and the duct 26 to the axial passage 20. From the passage 20, the fluid flows radially through the passage 22 and is then returned through the radial passage 24 to pass out of the roller R into the duct 28 and then back to the fluid circulating system 10 through a line 34.

The particular fluid circulated through the roller R, as indicated above, may vary. However, in one embodiment it has been found effective to employ simply water as a coolant. Subsequently, when the welding operation is complete, it has been found desirable to continue the flow of coolant through the roller R for a brief interval to insure against any heat concentrations which might otherwise develop and localize to intensive temperatures. Thereafter, in accordance herewith, air is circulated through the lubricant passages of the roller R, to purge them of water. Thus, the fluid circulating system 10 supplies either air or water depending upon the settings of the valves 12 and 14, established in accordance with the phase of operation.

Turning now to a detailed consideration of the seal 30 which is located at the end of the duct extension 26a, reference will now be had to FIG. 2 in which similar reference numerals to those of FIG. 1 are used to identify like parts. The seal 30 includes a resiliently deformable sleeve 36 formed of rubberlike material which is supported on a pair of retaining rings 38 and 40 which are telescopically press-fitted on the tubular duct extension 26a. The upstream ring 40 includes an annular cap 42, a central section 41 (of reduced external diameter) and a terminating ridge 43 defining an annular shoulder. The downstream or exit ring 38 incorporates an exhaust nozzle 44, a central section 45 (of reduced external diameter) and an annular ring 47. The rubberlike sleeve 36 is affixed to extend between the rings 38 and 40 by several turns 46 and 48 of line or wire, e.g., filament which are wrapped above the central sections 41 and 45 respectively.

The tubular duct 26 defines a plurality of transverse ports 52 immediately under the unsupported central portion 50 of the sleeve 36 providing fluid communication to the internal annular surface of the resiliently deformable section 50. The size of the ports 52 is not particularly critical.

In the operation of the seal 30, fluid flowing through the duct 28 develops a positive pressure from the orifice 54 of the nozzle 44. The fluid pressure so developed is applied through the ports 52 to the central portion 50 of the rubberlike sleeve 36, thereby enlarging the sleeve in an inflated manner (indicated in phantom) so that it firmly engages the inner walls of the passage 20. The engagement between the sleeve 38 and the wall of the passage 20 is sufficient to inhibit any substantial reverse flow of fluid passing from the nozzle 44 to return past the seal 30 through the annular passage.

It is to be noted that the seal 30 is particularly well suited to the system hereof in that while avoiding any necessity for close-tolerance fit or mechanical coupling, a reasonably effective seal is provided which can be mated with various central passages 20 that may have some deviation in size. Furthermore, it is to be noted that the seal 30 does not incur excessive wear with considerable use. Thus, a fluid injection means which incorporates a resiliently deformable seal that is expandable under the force of the fluid flow through the injector considerably improves the ease of operating the system hereof.

Returning now to further consider the system of FIG. 1, as indicated above, the roller R is revolved during the interval when weld metal M is deposited thereon. More specifically, the external rim 56 of the roller R must be revolved at a uniform, established speed, while the internal or hub portion of the roller remains stationary. The uniformity of the rotary motion, e.g. lack of slip, is exceedingly important to the operation of the system because unless the rotary motion is uniform, the deposition of metal M will not be uniform.

A rotary drive 60, which may include an electrical motor, is coupled through a shaft 62 to a circular drive plate 64. The plate 64 incorporates a conical axial extension 66, a portion of which is matingly received in a recess in the roller R to provide support in alignment with the seal 32. The plate 64 also carries a pair of rotary drive elements 68, for positively engaging the rim 56 of the roller and rotating it in relation to the central hub portion of the roller. The drive elements 68 are radially displaced from the axial extension 66 so as to lie in an annular path which is substantially aligned with the rim of the roller R. The details of the drive structures 68 are best illustrated in FIGS. 3 and 4 to which reference will now be made for a more detailed consideration thereof.

An angular bracket 70 (FIG. 3) is affixed to the plate 64 by a pair of studs 72 and extends axially from the plate 64 to receive a dog 74. Specifically, a bolt 76 receives a wing nut 78 to affix the dog 74 to the bracket 70. The drive dog 74 has a drive pin 80 seated therein, which pin has a pointed end to engage a flat side surface of the roller rim 56 as shown in FIG. 1.

It is to be noted that the drive pin 80 (FIG. 4) may move in a limited arc (defined by the stud 74a in an arcuate indentation) about the bolt 76. In engaging the pin 80 to the rim of the roller R it is set at a location short of its maximum extension in the arc, with the dog 74 angularly deposed in relation to the bracket 70. Consequently, when the plate 64 is revolved (upward in FIG. 4) the point of the pin 80 bites into the rim of the roller R imparting rotary force to the rim. Any resistance to rotation offered by the rim results in an increased force on the pin 80 thereby urging the point of the pin into more forceful engagement with the rim while forcefully turning the rim. As a consequence forceful contact with the rim is assured, thereby avoiding any troublesome slippage between the two elements.

As indicated, in addition to receiving fluid coolant and being revolved at a constant rate, the roller 56 also receives weld metal M. The metal M (FIG. 1) is supplied in the form of wire 82 from a reel 84 to an arc-welding head 86 including a wire nozzle 88 from which the wire finally emerges. The wire is thus fed to an electric arc which results in the fused deposition of the weld metal M.

The arc-welding head 86 may incorporate various structures as well known in the prior art for coupling electrical energy from an arc generator 90 to the weld wire 82 for establishing the desired arc to fuse the wire onto the roller R. A cable 91 extends to the head 86 from the arc generator 90 which is also connected to the rotary drive 60 as indicated by the wire 92 to accomplish ground return. Of course various electrical circuit arrangements may be successfully used as well known in the art.

The wire 82 is moved through the head 86 by a motor 93 that is coupled to wire-drive wheels (not shown) as well known in the prior art to feed weld wire to an arc. The wire guide or nozzle 88 is affixed to a tilting joint 89 which is rotatably affixed in the frame 95 of the head. A clamp arm 97 is threaded into the frame 95 to lock the joint 89 in any of a variety of positions so that the axis of the nozzle 88 lies perpendicular to the roller R. A swing of some 90° for the nozzle 88 has been found satisfactory in practice.

The welding head 86 is supported on a slide bar 94 which also carries limit switches 96 and 98. The head 86 is also connected by cables 100 and 102 to a scanning drive 104 (here shown as two separate units for simplified illustration). The limit switches 96 and 98 as well as the scanning drive 104 are electrically connected to an electrical control system 106 which actuates the scanning drive 104 to reciprocate the head 86 back and forth across the bar 94 until the desired weld is accomplished. The scanning drive may comprise a closed loop (including the cables 100 and 102) driven by a reversible motor (not shown) as well known in the art, to traverse the head between the limit switches 96 and 98. The electrical system 106 energizes the motor to accomplish the desired direction of movement, dependent upon which of the limit switches 96 or 98 was last actuated. Such systems are well known in the motor-control art.

It is to be noted that the individual turns of the weld metal M, as deposited on the roller rim 56 may be either a series of closed loops (in which case the scanning drive imparts a stepping motion) or a continuous spiral (in which case the scanning drive moves the head continuously or transverse stroke, dwell, roll index and reverse transverse weld, the then procedure is repeated). All three forms of operation are contemplated hereby.

Along with the supply of weld metal M that is applied to the roller R, granulated flux is also provided to accomplish a submerged-arc mode of operation. In this regard, a tapered hopper 108 contains granular flux which is supplied through a plastic tube to a trough 112. The trough 112 is supported by a universal mount 114 on a vibrator 116, and extends from the outlet of the hopper 108 to a position contiguous to the roller R. Consequently, a flow of granular flux is established from the hopper 108 to the trough 112 from which the flux is dispensed to cover the roller and thereby submerge the arc. The vibrating motion of the trough 112 imparted by the vibrator 116 results in a substantially continuous and uniform flow of flux from the trough. The even delivery of flux is particularly important in view of the cylindrical surface of the roller R.

With the turning of the roller rim the flux that is delivered to the roller R falls therefrom into a bin 118 covered by a screen grid 120. Thus, the flux is collected for reuse over and over in the operation of the system hereof. The bin 118 is normally mounted so as to be positioned most effectively with regard to a specific operation on a roller and as a matter of convenience. Metal straps 122 are affixed at the sides of the bin 118 to define elongate channels in which ridge members 124 (FIG. 5) define a pair of tracks. Sets of wheels 126 are fitted in the tracks and joined by an axle 128 which is rigidly supported on a frame 129. In using the apparatus as disclosed herein a roller R is first mounted in an operating position. Specifically, the end of the roller having an axial bore receives the injection structure 33 (which is fixed to the rigid frame of the apparatus) and the conical extension 66 from the drive plate 64 is fitted into a mating recess on the opposed side of the roller. The drive structures 68 are then engaged to the rim of the roller. Specifically, the wing nuts 78 are turned off the bolts 76 so as to set the dogs 74 canted with respect to the plane defined by the side of the roller R (FIG. 4). Note that the slot 70a and a stud 74a (affixed to the dog 74 to dwell in an arcuate space on the extension 70) limit the extent of movement for the dog 74. However, a wide range of positions is available to establish the angular engagement of the pins 80 with the roller rim. The rotary drive 60 may now be energized to revolve the rim of the roller at a uniform rate of speed.

Next, the valve 14 (FIG. 1). is opened to allow water to circulate from the circulating system 10 through the lubricant passages of the roller R as described above. As indicated in this regard, it is to be noted that the seal 30 avoids the expenditure of any significant amount of time or effort in defining the desired pattern of flow.

With the roller turning, and receiving coolant, the flux-supply system is next actuated by energizing the vibrator 116. The flow of flux so established floods the cylindrical surface of the roller so as to obtain submerged-arc operation. The flux falls from the roller R to pass through the screen 120 into the bin 118. The screen 120 separates the fused flux from the granular flux. As one of the preliminary operations, the bin 118 may be positioned on the rollers 126 to most effectively catch the falling flux.

Preliminary to actually depositing metal, the limit switches 96 and 98 are set at positions on the bar 94 to define the extent of traverse movement by the welding head 86, concurrently defining the section of the roller to be clad. Normally, the cylindrical section of the roller will be built up first and as a result, the head 86 is positioned as shown, with the wire nozzle 88 substantially vertical.

With the preliminary operations accomplished, the system is fully actuated to reconstruct the roller. thereafter the head 86 traverses the roller depositing turns of metal to form layers and thereby restore the roller to its desired shape.

On completion of the cylindrical section (indicated by a pattern gauge) the head 86 may be revolved to build up the roller flanges. That is, to accomplish a flow of the wire 82 that is perpendicular to the receiving surface, the clamp arm 97 is released, and rotary joint 89 accommodates movement of the wire nozzle 88 to a position as shown in FIG. 6, i.e., at an angle of some 45° from the vertical, for depositing metal on the roller flange. Thus, the roller is completely rebuilt by restoration to its original shape.

On completion of the rebuild operation, it has been found desirable to continue to cool the roller by the circulation of coolant for a short time. At the conclusion of such a period, the valve 14 is closed and the valve 12 is opened. As a result, air is circulated through the lubricant passages of the roller to purge the water from the roller, leaving it dry and ready to receive lubricant and be reinstalled on a tractor.

The integrated system hereof has been found to be particularly effective in view of various specific improved structural features as considered above. That is, the individual novel structures hereof each effectuate an improved roller-rebuild system attaining certain distinct advantages over previous systems.

We claim:

1. An apparatus for depositing metal by welding on a workpiece that includes an external rim and a cooperating internal structure wherein interconnected lubricant passages are defined, by and between said rim and said internal structure; comprising;

a fluid injection means for providing a stream of cooling fluid circulating through said interconnected lubricant passages of said workpiece;

arc-welding apparatus for depositing molten metal on said rim of said workpiece;

a mounting support for supportably setting said arc-welding apparatus at various angular positions in relation to said workpiece;

a rotary power source;

means for engaging said rotary power source to said workpiece whereby to revolve said rim of said workpiece in relation to said arc-welding apparatus;

a bin for containing granular-welding flux;

a trough for receiving flux from said bin and extending to transport such flux to said rim of said workpiece; and vibratory means for vibrating said trough to motivate said flux to said rim.

2. An apparatus according to claim 1 wherein said mounting support further includes a scanning drive means for moving said arc-welding apparatus transversely across said rim.

3. An apparatus according to claim 1 wherein said mounting support comprises a tilting means for rotational displacement to accomplish said various angular positions.

4. An apparatus according to claim 3 wherein said mounting support further includes a scanning drive means for moving said arc-welding apparatus transversely across said rim.